United States Patent [19]
Rawlins

[11] Patent Number: 5,277,918
[45] Date of Patent: Jan. 11, 1994

[54] FISH ATTRACTANT AND SCENT MASKING COMPOSITION

[76] Inventor: Donald W. Rawlins, 224 Highland Dr., S.W., Calhoun, Ga. 30701

[21] Appl. No.: 878,170

[22] Filed: May 4, 1992

[51] Int. Cl.$^5$ .................... A01K 85/00; A23L 1/325
[52] U.S. Cl. .................... 426/001; 426/002
[58] Field of Search ............ 426/001, 002, 643, 641

[56] References Cited

U.S. PATENT DOCUMENTS

| | | | |
|---|---|---|---|
| 4,887,376 | 12/1989 | Sibley et al. | 426/001 |
| 4,927,643 | 5/1990 | D'Orazio et al. | 426/001 |
| 4,993,183 | 2/1991 | Carver | 426/001 |

FOREIGN PATENT DOCUMENTS

| | | | |
|---|---|---|---|
| 2045748 | 4/1972 | Fed. Rep. of Germany | 426/001 |
| 3237747 | 10/1988 | Japan | 426/001 |

*Primary Examiner*—Arthur L. Corbin
*Attorney, Agent, or Firm*—Needle & Rosenberg

[57] ABSTRACT

The invention provides a penetrating scent/taste attractant for the use on fishing lures. More particularly, a scent attractant that actually penetrates the surface coating or the actual bait body is provided. A combination of a scent attractant and a dye for application to a bait to provide a penetrating scent and a permanent color change simultaneously is also provided. Also provided is a formulation for the application of a scent attractant, with or without a solvent-soluble dye, singularly dispersed or dissolved into a solvent capable of attacking the surface of an artificial bait and promoting a migration of either or both the fish-attractant and dye below the surface of the bait.

19 Claims, No Drawings

FISH ATTRACTANT AND SCENT MASKING COMPOSITION

BACKGROUND OF THE INVENTION

Fishing is an increasingly popular sport, with over 75 million enthusiasts involved in the United States of America. The increasing amount of fishermen and the limited fishing waters lead the way for more innovative products and methods for increasing the fishing yield in this competitive sport. Many of these new products are related to the stimulation of the olfactory, visual, and even sound senses of fish and include a wide variety of products and application methods.

Fish, especially sport-fish, are generally attracted to smaller bait-fish and anything natural that falls into or lives in the water, such as insects, frogs, crawfish, and worms. Most new developments for artificial baits are new designs or variations of previous designs which better simulate an actual bait-fish or other natural food. New color combinations are also being constantly designed and applied to existing and new baits for visual stimulation of the fish.

Fish are attracted to baits by their keen sense of smell as well as by visual means. A variety of products designed to stimulate these senses is presently available. Among these products, scent attractants are commonly used to increase the likelihood of success. These scent attractants tend to be oil or water based and therefore need to be constantly reapplied to the bait. This reapplication is necessary because the oil or water-based material dissipates as the formulation is washed away by the water. These scent attractant products are usually very messy to work with, often leaving behind oily residues on the fisherman and equipment.

Scent attractant products are also available in various other forms, such as in water-soluble polymers which attach themselves to the exterior coating of the lure as in U.S. Pat. No. 4,927,643. This type of polymer coating requires a longer drying time due to the addition of the polymer. The polymer coating also absorbs the fish attractant, preventing penetration into the lure.

Thus, there is a definite need for a scent attractant product that ca penetrate the lure and therefore does not require constant reapplication, dries quickly, and does not result in an oily mess. This invention satisfies this need by utilizing a scent with a volatile solvent which allows the scent to penetrate the bait.

Products also exist that enable the fisherman to change the color of a variety of plastic baits. This is usually accomplished by dipping the lure into a volatile solvent containing a dye. The lure is immediately removed from the solution and allowed to dry. As soon as most of the solvent has evaporated, the lure will have a different color and can be used immediately. However, in this application, some of the residual solvent or even the dye can emit a chemical odor that is offensive to the fish. Thus, there also exists a definite need for a product that can be applied by the fisherman that can both change the color of a plastic bait and which adds a long-lasting scent attractant in one simple process. The present invention also satisfies this need by utilizing the volatile solvent and scent with a dye.

SUMMARY OF THE INVENTION

The invention provides a composition for applying to a bait to attract fish or mask a scent on the bait, comprising a masking or attracting scent and a suitable volatile solvent, in the absence of a polymer. Preferably the solvent comprises between about 80-99.9% by weight of the composition, especially between about 90-99.5% by weight of the composition, and most preferably between about 97.5-99.5% by weight of the composition.

DETAILED DESCRIPTION OF THE INVENTION

The invention provides a composition for applying to a bait to attract fish or mask a scent on the bait, comprising a masking or attracting scent and a suitable volatile solvent, in the absence of a polymer. Preferably the solvent comprises between about 80-99.9% by weight of the composition, especially between about 90-99.5% by weight of the composition, and most preferably between about 97.5-99.5% by weight of the composition.

As used herein, "attract" means to incorporate a scent into a bait such that the scent is released and detected by a fish's olfactory organs to stimulate the "feed" response. By "mask" is meant to release a scent such that scents which are repulsive to a fish are less detectable by the fish.

As described herein, only "suitable" scents and solvents are within the scope of the invention. Thus, scents that are repulsive to a fish are not within the scope of the invention. Likewise, solvents which do not allow penetration into the bait for prolonged release of scent are not within the scope of the invention.

The drying time of the subject invention is preferably less than one minute. More preferably, the drying time is less than 30 seconds, especially less than about 10 seconds.

The composition of the invention can further comprise a suitable solvent soluble dye. The solvent soluble dye would readily be known to one skilled in the art and can be selected from the group consisting of basic, acid or solvent group of dyes. Common suitable examples include C.I Solvent Blue 35, C.I. Solvent Yellow 72, and C.I. Solvent Yellow 33. The composition can be applied to a bait. By "bait" is meant anything used to attract and catch a fish, for example a lure, plastic worm, or a live bait.

The invention also provides a method of attracting a fish to a bait comprising applying the subject composition to the bait and placing the bait in the presence of a fish.

As used herein, "volatile" means a solvent which penetrates into the bait rather than forming a coating on the surface of the bait. Such penetration allows the scent, which penetrates with the solvent, to be more slowly released in water.

Many volatile solvents are available that have the unique capability to penetrate a variety of plastics such as polyvinylchloride (PVC), polystyrene, urethane, and others. These solvents actually permeate into the plastic on contact and evaporate when exposed to the atmosphere. As the solvent permeates into the plastic surface, dissolved molecules such as compatible fish attractants and/or solvent-soluble dyes permeate into the plastic along with the solvent. The nonvolatile or very low volatile fish attractants and/or dyes remain with the plastic both on and below the surface after the solvent evaporates. Even though the fish attractants are considered nonvolatile, they do slowly evaporate over extended periods of time, releasing scent and taste that attract fish.

Acetone is a preferred example of a suitable solvent because of its fast evaporation characteristics and overall performance. Even though acetone is flammable, it has no harmful effects to the environment. When utilized in this invention, acetone dries in a matter of seconds, allowing for almost immediate use of the bait. When used in a fine-mist spray applicator for painted plastic or wood lures, it quickly dries with no blemishing effect to the coating.

Other suitable solvents include ketones such as methyl ethyl ketone, diethyl ketone, methyl acetone, and tetra hydro furan. Examples of esters include butyl acetate, ethyl acetate, methyl acetate, and propyl acetate. Alcohols include methyl alcohol and ethyl alcohol. Chlorinated solvents such as methylene chloride, trichloroethane, and perchlorethylene will also work. Toluene and xylene are two types of hydrocarbon solvents that will work. Although these solvents and others work, due to slow drying they are less preferred than acetone when dipped into the composition. However, when utilized in a fine mist spray, these solvents can be very effective.

Moreover, the present invention is composed of a scent attractant formulated into a volatile solvent, for the purpose of adding a penetrating scent attractant to a bait. This invention can also provide a combination of scent attractant, dye and volatile solvent designed to add a penetrating scent and cause a color change to a lure in a single process or application step. The combination of dye and scent attractant alleviates the problem of residual chemical odors left by dye and also adds a longlasting scent attractant to the lure being treated.

The scent attractor/masker, or combination of scent attractors/maskers include, for example, all scents presently utilized in the art including garlic oil, shrimp oil, anise oil, artificial and natural fish or seafood oils or extracts of worms or fish, shrimp, crabs, clams or artificial equivalents. A concentrated form of attractant is preferred to give best results. However, if too much attractant is used, the excess may not penetrate the lure completely and may leave behind an undesirable residue after the solvent has evaporated.

The following examples are intended to illustrate but not limit the invention. While they are typical of those that might be used, other procedures known to those skilled in the art may be alternatively employed. In particular, any of the above alternative formulations can be substituted for the formulations used in the Examples.

EXAMPLE I

A formulation of a garlic-scented penetrating attractant is composed of the following ingredients an percentages: garlic oil (substantially pure) (Berjé, Bloomfield, N.J.), 0.5% by weight; and acetone, 99.5%. When applied, the garlic attractant remained in the bait for extended time periods.

EXAMPLE II

A formulation of an anise scented penetrating attractant is composed of the following ingredients and percentages: anise oil, 2.5% by weight; and acetone, 97.5%. when applied, the formulation remained in the bait for extended time periods.

EXAMPLE III

A formulation of a garlic scented penetrating attractant with a red dye is composed of the following ingredients and percentages: garlic oil, 0.5% by weight; C.I. Solvent Red. 24, 0.4%; and acetone, 99.1%. When applied, the formulation remained in the bait for extended time periods and the bait was dyed red.

EXAMPLE IV

A formulation of a nonflammable anise scented penetrating attractant with a blue dye is composed of the following ingredients and percentages: anise oil, 2.5% by weight; C.I. Solvent Blue 35, 0.5%; and 1,1,1 trichloroethane, 97%. When applied, the formulation remained in the bait for extended time periods and the bait was dyed blue.

EXAMPLE V

An example of an application by dipping consists of adding any of the above formulations in a bottle (normally two ounces) and dipping a lure such as a plastic worm partially into the liquid-filled container. The worm is immediately removed and allowed by dry for a few seconds. After drying, an odor is very apparent and remained for extended periods. Also a color change was observed if a dye/scent combination was used.

EXAMPLE VI

Any example of an application by non-aerosol spraying consists of adding any of the above formulations to a fine-mist spray bottle and spraying a mist on the lure of choice. Drying takes a few seconds, as shown in Example V.

Although the present processes have been described with reference to specific details of certain embodiments thereof, it is not intended that such details should be regarded as limitations upon the scope of the invention except as and to the extent that they are included in the accompanying claims.

What is claimed is:

1. A composition, in the absence of a polymer, for application to a bait to attract fish or mask a scent on the bait, comprising:
    (a) a masking or attracting scent present in an amount sufficient to mask a scent on the bait or attract a fish; and
    (b) a suitable volatile solvent which is capable of dissolving the scent and capable of penetrating the bait thereby causing penetration of the scent into the bait for prolonged release of the scent.

2. The composition of claim 1, wherein the solvent comprises between about 80-99.9% by weight of the composition.

3. The composition of claim 1, wherein the solvent comprises between about 90-99.5% by weight of the composition.

4. The composition of claim 1, wherein the solvent comprises between about 97.5-99.5% by weight of the composition.

5. The composition of claim 1, wherein the scent is selected from the group consisting of earthworm extract, a fish scent, a seafood scent, and an oil.

6. The composition of claim 1, wherein the scent is selected from the group consisting of garlic oil and anise oil.

7. The composition of claim 1, wherein the solvent is acetone.

8. The composition of claim 1, wherein the solvent is 1,1,1 trichloroethane.

9. The composition of claim 1, wherein the solvent is methyl ethyl ketone.

10. The composition of claim 1, wherein the solvent is toluene.

11. The composition of claim 1, wherein the solvent is xylene.

12. The composition of claim 1, wherein the solvent is selected from the group consisting of a ketone, an alcohol, a chlorinated solvent and a hydrocarbon solvent.

13. The composition of claim 1, wherein the fish attractant scent is comprised of more than one different fish attractant scent.

14. The composition of claim 1, applied to a bait.

15. The composition of claim 1, wherein the bait is a lure.

16. The composition of claim 1, wherein the bait is a plastic worm.

17. A composition, in the absence of a polymer, for application to a bait to attract fish or mask a scent on the bait comprising:
 (a) a suitable solvent soluble dye;
 (b) a masking or attracting scent present in an amount sufficient to mask a scent on a bait or attract fish; and
 (c) a suitable volatile solvent which is capable of dissolving the scent and the dye and capable of penetrating the bait thereby causing penetration of the scent and dye into the bait for prolonged release of the scent and a change in color of the bait.

18. The composition of claim 17, wherein the solvent soluble dye is C.I Solvent Blue 35.

19. A bait product consisting essentially of a bait in combination with a composition consisting essentially of:
 (a) a masking or attracting scent present in an amount sufficient to make a scent on the bait or attract a fish; and
 (b) a suitable volatile solvent which is capable of dissolving the scent and capable of penetrating the bait thereby causing penetration of the scent into the bait for prolonged release of the scent.

* * * * *